(12) United States Patent
Qian et al.

(10) Patent No.: US 10,834,151 B2
(45) Date of Patent: Nov. 10, 2020

(54) DYNAMIC COMMUNICATION LINK MANAGEMENT FOR MULTI-USER CANVAS

(71) Applicant: Lenovo (Singapore) Pte. Ltd., Singapore (SG)

(72) Inventors: Ming Qian, Cary, NC (US); Jian Li, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 304 days.

(21) Appl. No.: 14/286,477

(22) Filed: May 23, 2014

(65) Prior Publication Data
US 2015/0341398 A1 Nov. 26, 2015

(51) Int. Cl.
*G06F 3/0484* (2013.01)
*H04L 29/06* (2006.01)
*H04L 29/08* (2006.01)
*G06F 3/033* (2013.01)

(52) U.S. Cl.
CPC ............ *H04L 65/403* (2013.01); *G06F 3/033* (2013.01); *G06F 3/0484* (2013.01); *G06F 3/04845* (2013.01); *H04L 67/1044* (2013.01); *H04L 67/22* (2013.01)

(58) Field of Classification Search
CPC .... H04L 65/403; H04L 67/22; G06F 3/04845
See application file for complete search history.

(56) References Cited

U.S. PATENT DOCUMENTS

| | | | |
|---|---|---|---|
| 5,930,783 A | 7/1999 | Li et al. | |
| 7,246,329 B1 | 7/2007 | Miura et al. | |
| 8,489,999 B2 | 7/2013 | Harvey et al. | |
| 2003/0182375 A1* | 9/2003 | Zhu | G06F 17/24 709/205 |
| 2003/0225833 A1 | 12/2003 | Pilat et al. | |
| 2004/0150627 A1* | 8/2004 | Luman | G06Q 10/10 345/173 |
| 2006/0119591 A1* | 6/2006 | Ericson | G06F 3/0321 345/179 |
| 2010/0058201 A1* | 3/2010 | Harvey | G06Q 10/10 715/753 |
| 2010/0114965 A1* | 5/2010 | Dean | G06F 17/30699 707/784 |
| 2010/0138756 A1* | 6/2010 | Saund | H04L 12/1827 715/758 |
| 2010/0153857 A1* | 6/2010 | Sanchez | G06F 9/4443 715/756 |
| 2010/0228825 A1* | 9/2010 | Hegde | G06F 21/6218 709/204 |
| 2010/0313249 A1 | 12/2010 | Castleman | |
| 2011/0246908 A1 | 10/2011 | Akram | |

(Continued)

OTHER PUBLICATIONS

"U.S. Appl. No. 14/283,962, Advisory Action dated Jan. 27, 2017", 3 pgs.

(Continued)

*Primary Examiner* — Jeanette J Parker

(74) *Attorney, Agent, or Firm* — Schwegman Lundberg & Woessner, P.A.

(57) ABSTRACT

A method includes determining where multiple users are interacting with a canvas via user devices, identifying two users that are interacting proximate to each other on the canvas via their user devices, and establishing a communication mechanism between the two users.

18 Claims, 3 Drawing Sheets

(56) References Cited

U.S. PATENT DOCUMENTS

| | | | |
|---|---|---|---|
| 2012/0176416 A1 | 7/2012 | Dondurur et al. | |
| 2012/0229425 A1 | 9/2012 | Barrus et al. | |
| 2013/0031100 A1* | 1/2013 | Graham | H04L 51/32 707/739 |
| 2013/0132586 A1* | 5/2013 | Farmer | H04L 12/1822 709/226 |
| 2013/0318445 A1* | 11/2013 | Mitchell | G06F 3/041 715/744 |
| 2014/0149880 A1* | 5/2014 | Farouki | H04L 12/1822 715/748 |
| 2014/0267105 A1* | 9/2014 | Kumetani | G06F 3/0416 345/173 |
| 2014/0331149 A1* | 11/2014 | Labey | H04L 67/14 715/757 |
| 2015/0106740 A1* | 4/2015 | Tan | G06F 3/0484 715/750 |
| 2015/0134737 A1* | 5/2015 | Albrecht | H04L 12/1822 709/204 |
| 2015/0149929 A1* | 5/2015 | Shepherd | H04L 65/403 715/753 |
| 2015/0244943 A1 | 8/2015 | Brown | |
| 2015/0339465 A1 | 11/2015 | Qian | |

OTHER PUBLICATIONS

"U.S. Appl. No. 14/283,962, Examiner Interview Summary dated Feb. 2, 2017", 3 pgs.

"U.S. Appl. No. 14/283,962, Final Office Action dated Dec. 16, 2016", 24 pgs.

"U.S. Appl. No. 14/283,962, Non Final Office Action dated Jun. 23, 2016", 22 pgs.

"U.S. Appl. No. 14/283,962, Response filed Jan. 6, 2017 to Final Office Action dated Dec. 16, 2016", 14 pgs.

"U.S. Appl. No. 14/283,962, Response filed Mar. 15, 2017 to Final Office Action dated Dec. 16, 2016", 14 pgs.

"U.S. Appl. No. 14/283,962, Response filed Sep. 22, 2016 to Non Final Office Action dated Jun. 23, 2016", 10 pgs.

"U.S. Appl. No. 14/283,962, Non Final Office Action dated Jul. 26, 2017", 24 pgs.

"U.S. Appl. No. 14/283,962, Advisory Action dated Apr. 24, 2018", 5 pgs.

"U.S. Appl. No. 14/283,962, Final Office Action dated Feb. 6, 2018", 21 pgs.

"U.S. Appl. No. 14/283,962, Response filed Mar. 29, 2018 to Final Office Action dated Feb. 6, 2018", 9 pgs.

"U.S. Appl. No. 14/283,962, 14/283, Reponse filed Oct. 26, 2017 to Non Final Office Action dated Jul. 26, 2017", 10 pgs.

"U.S. Appl. No. 14/283,962, Advisory Action dated Mar. 27, 2019", 5 pgs.

"U.S. Appl. No. 14/283,962, Examiner Interview Summary dated Apr. 4, 2019", 2 pgs.

"U.S. Appl. No. 14/283,962, Final Office Action dated Dec. 31, 2018", 27 pgs.

"U.S. Appl. No. 14/283,962, Non Final Office Action dated Jul. 3, 2018", 24 pgs.

"U.S. Appl. No. 14/283,962, Response filed May 7, 2018 to Advisory Action dated Apr. 24, 2018", 9 pgs.

"U.S. Appl. No. 14/283,962, Response filed Sep. 13, 2018 to Non Final Office Action dated Jul. 3, 2018", 10 pgs.

\* cited by examiner

DYNAMIC COMMUNICATION LINK MANAGEMENT FOR MULTI-USER CANVAS

BACKGROUND

Collaborative use of applications is becoming more common. Existing applications on networked computers allow multiple users to access a shared canvas in a social creative environment. Sometimes conflicts may occur when users attempt to access a same space on the canvas.

SUMMARY

A method includes determining where multiple users are interacting with a canvas via user devices, identifying two users that are interacting proximate to each other on the canvas via their user devices, and establishing a communication mechanism between the two users.

A machine readable storage device has instructions for execution by a processor of the machine to determine where multiple users are interacting with a canvas via user devices, identify two users that are interacting proximate to each other on the canvas via their user devices, and establish a communication mechanism between the two users.

A device including a processor and a memory device having a program stored thereon for execution by the processor to determine where multiple users are interacting with a canvas via user devices, identify two users that are interacting proximate to each other on the canvas via their user devices, and establish a communication mechanism between the two users.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, a dynamic information exchange link is set up and managed to facilitate social creation on a shared virtual canvas as a function of at least one of user drawing device locations and drawing content tags. The link may be an audio link, video line, or text exchange line, and canvas may be a drawing or writing canvas. By using the dynamic information exchange link, a system can help a user to use information links with the related users located at neighboring zones or working on highly correlated contents even if they are located far away from each other so that they can coordinate their creative drawing and writing efforts.

In further embodiments, exclusive access zones may be created for user's content. A user may claim an access zone dynamically based on drawing strokes.

Figure 1:
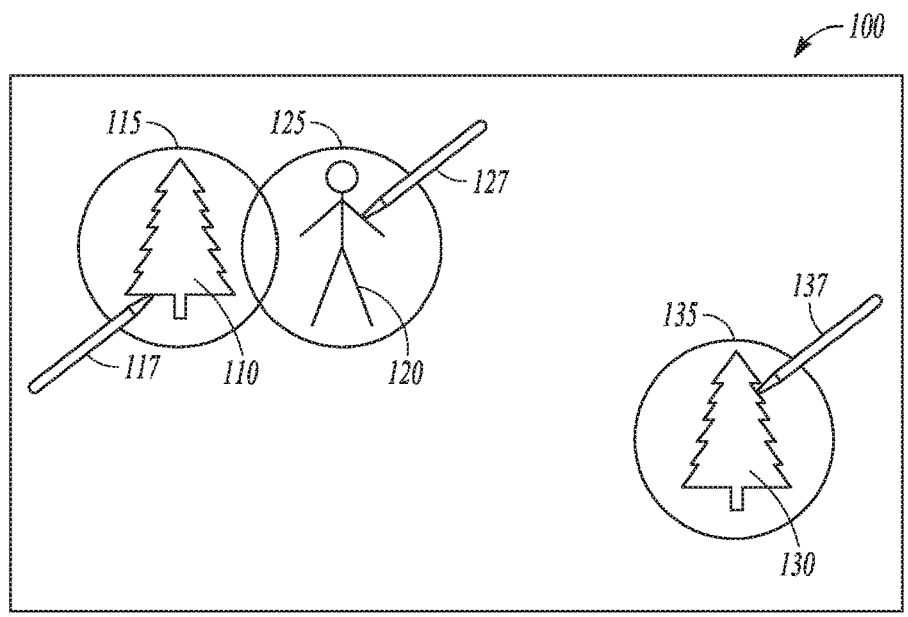
FIG. 1 is a block representation of a virtual canvas with drawings according to an example embodiment.

The system creates and manages communication links dynamically as a user moves around in the shared space as illustrated at 100 in FIG. 1. While moving, the user may be creating content on the canvas as indicated at 110, 120, and 130. The content is illustrated with a corresponding boundary 115, 125, and 135 that represents a content area for each user. A smart pen 117 is indicated in content area 115 that encloses content 110. A smart pen 127 is indicated in content area 125 that encloses content 120. A smart pen 137 is indicated in content area 135 that encloses content 130. Note that the content area may also represent users creating content that is closer to some users while farther away from other users. While smart pens are shown in FIG. 1 as an example user drawing device, many other drawing devices may be used in further embodiments, such as a touchscreen usable by a stylus, or user finger, with a system or other computing device driving the touchscreen providing an ID to identify an entity that is interacting with the shared space.

In one embodiment, the communication or information exchange links are established, maintained and torn down to facilitate coordination with nearby users to allow coordination between the users working closely or on similar content. In the example shown on canvas 100, a communication link would be established between the two users working in areas 115 and 125, as they overlap. In further embodiments, the link may be established based on distance between respective user drawing devices or instruments, such as smart pens, as opposed to a boundary identifying areas 115 and 125.

In still further embodiments, communication links may be established based on similarity of content being created by two users. The similarity of content may be identified based on metadata created by the user or observed by image or graphic analysis software. For example, in FIG. 1, the user drawing a tree indicated at 110, and the user drawing a tree at 130 may both describe in metadata that they are drawing a tree, or a pine tree if they desire to provide even more detail. The metadata for both indicate that their drawings are highly related, and the system may provide each with a communication link. Similarly, software based analysis of the two drawings may also result in a link being established.

The link may be established regardless of distance between the two areas where the trees are being drawn in one embodiment. In further embodiments, some form of distance criteria may be included in deciding whether or not to link users with similar metadata. The users may use the link, or decline to use the link.

Meanwhile, the metadata provided by the user drawing what looks like a person at 120 would not likely result in a match. However, as indicated above, the user may still be connected with another proximate user.

In one embodiment, a smart pen or other user drawing device interface may be used for supporting the establishment and management of the communication link. A pen or device ID may be used for correlating users with locations on the canvas for each of the different users. In further embodiments, a user name or code and optionally a password may be used to identify a user, and the drawing device need not have an identity. Distances between the identified users on the canvas may then be calculated. In one embodiment, users who have their drawing devices actively creating content and located close to each other may have the information exchange links established and maintained. And as two user's drawing devices become more distant from each other, such as determined by crossing a configured distance threshold, the information exchange link would be torn down automatically.

Figure 2:
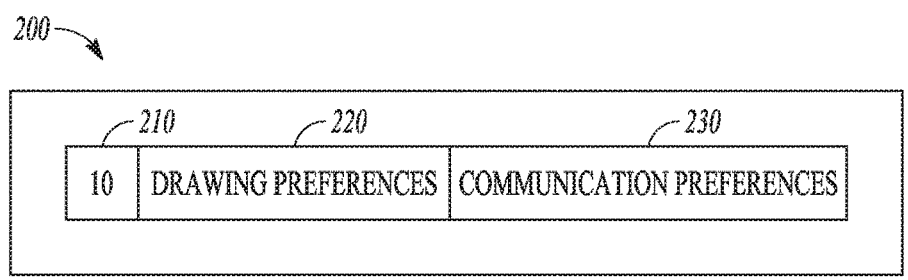
FIG. 2 is a block representation of data stored in a device for interacting with a virtual canvas according to an example embodiment.

Drawing devices such as smart pens may also contain configuration information, indicated at 200 in FIG. 2. The communication information may include a unique user ID 210, and may also include drawing preferences 220 and/or communication preferences 230 in various embodiments. The user ID 210 may also be the same as a pen ID, or the two IDs may be otherwise associated with each other, or remain separate to preserve anonymity. The communication preferences may provide video conferencing connection information, mobile phone number, email address, and other connection information. The system may use such information to determine preferred communication mechanisms and determine a best way to establish a communication link between two users. If the preferred communication mechanism of both users is the same, that mechanism may be automatically established, with notice provided to each user. If there is no common preferred communication mechanism, but a match of acceptable mechanisms, an acceptable mechanism may be chosen.

Figure 3:
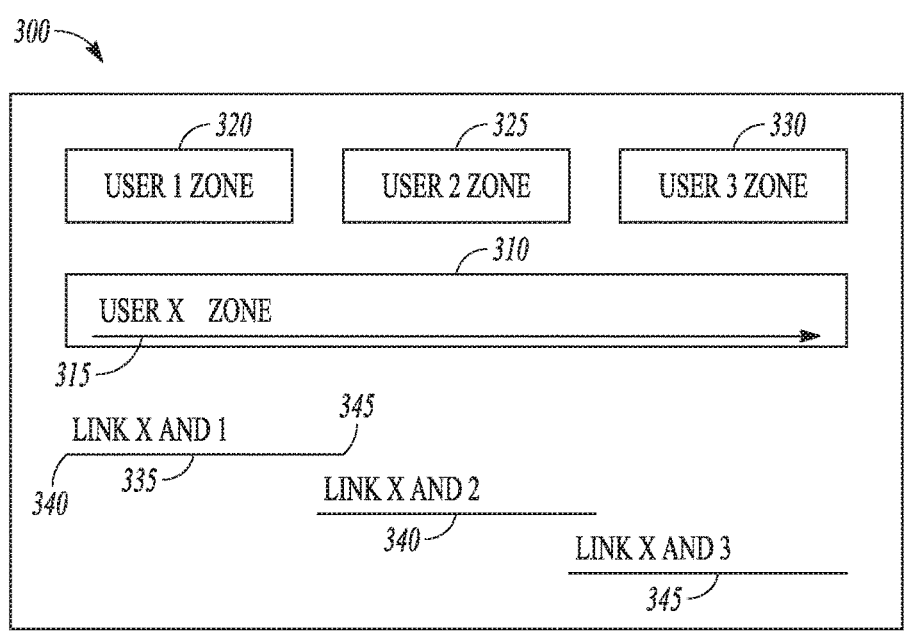
FIG. 3 is a block diagram representation of communication link management based on drawing position according to an example embodiment.

FIG. 3 at 300 shows an illustration that UserX at 310 is drawing at 315 from left to right. UserX's drawing zone is shown as coming close to zones used by User1 at 320, User2 at 325, and User3 at 330 consecutively. Note that a two dimensional representation of the drawing 315 and zones is used, but are also representative of three dimensional and higher dimensional drawing and zones. At least one higher dimension may be time, while others may at least include different versions of the canvas in further embodiments. The content may also be a movie with many temporally related frames, each frame corresponding to a canvas. Users working on different canvases may also be linked via a communication link. The information exchange links between UserX and different other users are established, maintained and torn down as his pen location changes along the way as indicated at 335, 340, and 345. Link 335 is created as a beginning portion 340 of drawing 315 approaches or enters user 1 zone 320. The link is maintained until the drawing 315 ends at 345 when leaving an area coinciding with User1 zone 320. The link 335 may be maintained for a short distance or time after leaving in some embodiments. Distance and time thresholds may be established or selected by various users, or system defaults to determine when to establish and/or remove communication links. The same process is used for creating, maintaining, and removing links 340 and 345 as the drawing 314 progresses near, through, and past user zones 325 and 330.

While FIG. 3 appears to represent geometric dimensions, it also represents a dimension representative of the content itself in further embodiments. In addition to the distance criterion, the content itself may also be used to decide whether an information exchange link should be established or not, for example the content. If two users are working on content that are highly related to each, information exchange between them might be helpful regardless of the distance between their working zones. The closeness of the content can be decided based on a user's tagging on their drawing content, for example, or from a software based analysis of the content using pattern recognition techniques commonly used in image recognition systems.

In one embodiment, the users may be provided with options to use for the communication mechanism. A user interface may include a pop-up window on the canvas asking each user if they desire to establish a link with the other user. The other user's content may be highlighted on the canvas to provide relevant information to each user in making the decision. A drop down menu of alternative communication mechanisms may also be provided, and if agreement is reached, the link may be established.

Figure 4:
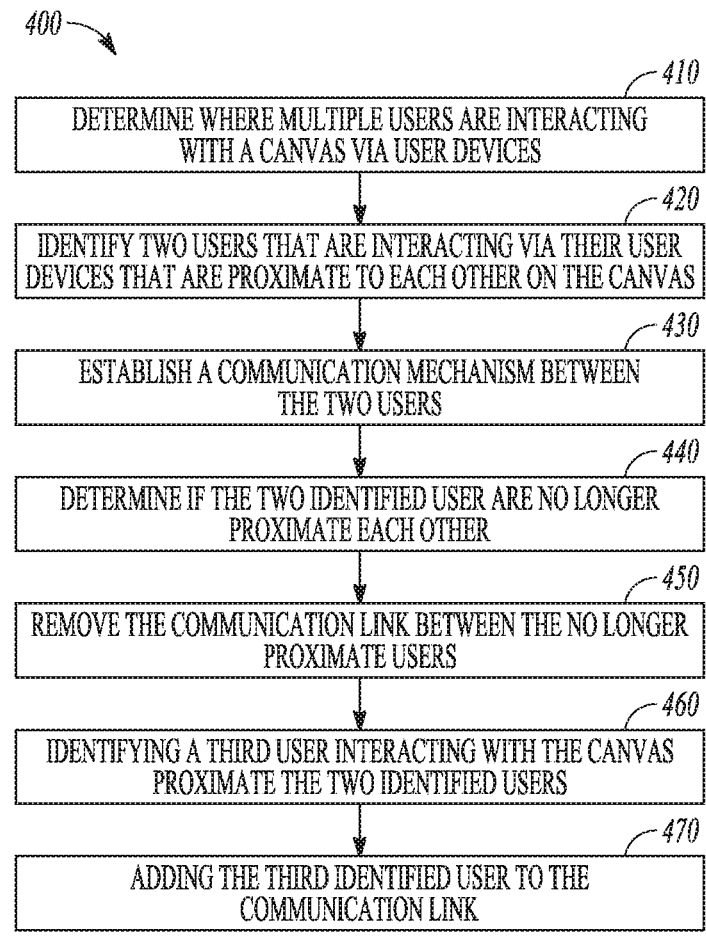
FIG. 4 is a flowchart illustration of a method of managing communication links according to an example embodiment.

FIG. 4 is a flowchart illustrating a method 400 of establishing a communication link. The method includes determining at 410 where multiple users are interacting with a canvas via user devices. At 420, two or more users are identified that are interacting via their user devices that are proximate to each other on the canvas. A communication mechanism or link is established at 430 between the two users.

In various embodiments, the canvas comprises a whiteboard drawing space. The user devices may be a smart pen or other device having an ID. The user device may also include drawing preferences, and communication preferences in further embodiments. In still further embodiments, the user device may be touchscreen usable by a stylus, with a system or other computing device driving the touchscreen providing the ID, user preferences, and communication preferences.

Method 400 may be performed by a user device or a server accessed by the user devices. The communication mechanism may be one or more of text messaging, email, interactive video, and chat. Each user device may specify a communication mechanism. Establishing a communication link may include identifying a common communication mechanism between two proximate users and initiating the identified communication mechanism.

The method 400 may also include determining at 440 if the two identified users are no longer proximate each other. The communication link may be removed at 450 between no longer proximate users. Still further, a third user interacting with the canvas proximate the two identified users may be identified at 460, with the third identified user added to the communication link at 470.

The users are identified as proximate each other if they are interacting with the canvas in a same identified zone in one embodiment. Users may also be identified as proximate each other if they are interacting with the canvas within an identified distance. Interacting with the canvas includes drawing on the canvas, hovering over the canvas, tapping the canvas, or interacting with the canvas on related content. Related content may be identified based on metadata provided by each user describing the content they are working on, or via image recognition type of software.

Figures 5, 6:
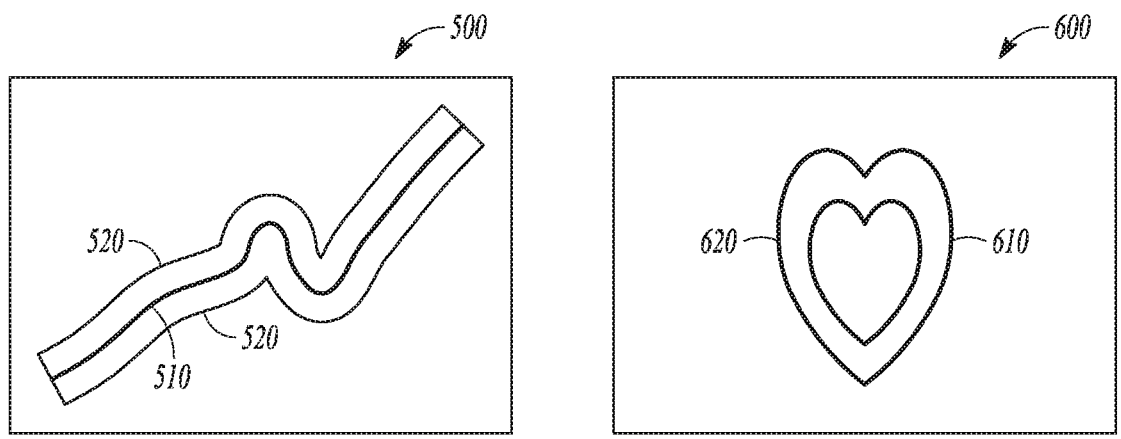
FIG. 5 is a representation of a virtual canvas with a drawing and protection zone according to an example embodiment.
FIG. 6 is a representation of a virtual canvas with a drawing of an enclosed shape and corresponding protection zone according to an example embodiment.

FIG. 5 is a representation of a virtual canvas 500 generated by an application running on a system. A user has drawn a line 510. The system has generated a protection zone 520 around the line 510. In one embodiment, the protection zone is an exclusive access zone that only the user, or device that drew the line 510 may draw in. The user may authorize others to draw within the exclusive access zone via access controls available to the user. As the user generates the stroke 510 on the virtual canvas 500, the protection zone 520 of configurable width may be generated along the stroke trajectory.

In one embodiment, once a user generates strokes, their work would be kept on the canvas without further modifications from other users unless permitted by the user or an administrator of the system. Users can freely generate their drawing and writing in the available space. No pre-assigned static zone would be needed using this dynamic approach, but may be used if desired.

In FIG. 6, on a virtual canvas 600, a closed shape 610 (e.g. a heart shape) is formed. A protection zone 620 is established dynamically in response to the drawing of the heart shape. All space inside the protection zone 620 becomes an exclusive space for the user to draw in and provide access rights as desired. The size of the zone may be established by the user and stored as configuration information either in a writing device or system used by the user, or otherwise identified by the user to virtual canvas software.

In one embodiment, a smart pen and pen interface can be used for supporting a protection zone. The protection zone width can be configured through the pen interface, and the different protection zone generation rules can be installed through the smart pen and pen interface. The pen ID can be used for identifying and differentiating different users, therefore a user's pen cannot generate any strokes in the protection (exclusive) zones generated by the other users unless the owner of the protection zone permits it. A user ID may alternatively be used with a pen or other writing device in further embodiments.

In various embodiments, the protection zone may persist until released by a user. Such a persisted protection zone provides protection from other users drawing in the zone until released.

Figure 7:
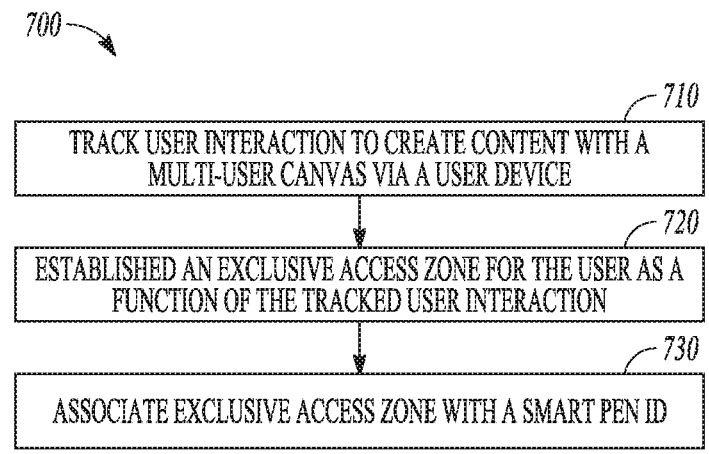
FIG. 7 is a flowchart illustrating a method of creating dynamic protection zones on a virtual canvas according to an example embodiment.

FIG. 7 is a flowchart illustrating a method 700 of creating protection zones. Method 700 includes tracking user interaction to create content with a multi-user canvas via a user device at 710. At 720, an exclusive access zone for the user is established as a function of the tracked user interaction.

In one embodiment, exclusive access zone access rights are definable by a user. The user device may be a smart pen having an ID. At 730, the exclusive access zone may be associated with the ID.

The user interaction may include drawing lines on the canvas, with the exclusive access zone comprising a protection width extending from each line. The user interaction may further include drawing an enclosed shape on the canvas, and wherein the exclusive access zone comprises an area enclosed by the shape. The enclosed shape in one embodiment may include a line that includes gaps, but is substantially enclosed. Examples might include a broken line outline of an enclosed shape, a shape that is almost closed, but may include a minor gap, and a shape that represents a normally closed shape, such as a multiple line drawing of a face.

The exclusive access zone may comprise a protection width outside of the enclosed shape. The width may correspond to a default width of the system, or a user specified width within system limits. The width may be expressed as an actual distance, or a percentage of the overall canvas dimensions.

In one embodiment, the exclusive access zone persists until removed by the user, and may be releasable to a user with a higher privilege.

The user device may include drawing preferences of a user and contact information for the user. Multiple different exclusive access zones may be created based on user interaction with different portions of the canvas.

Figure 8:
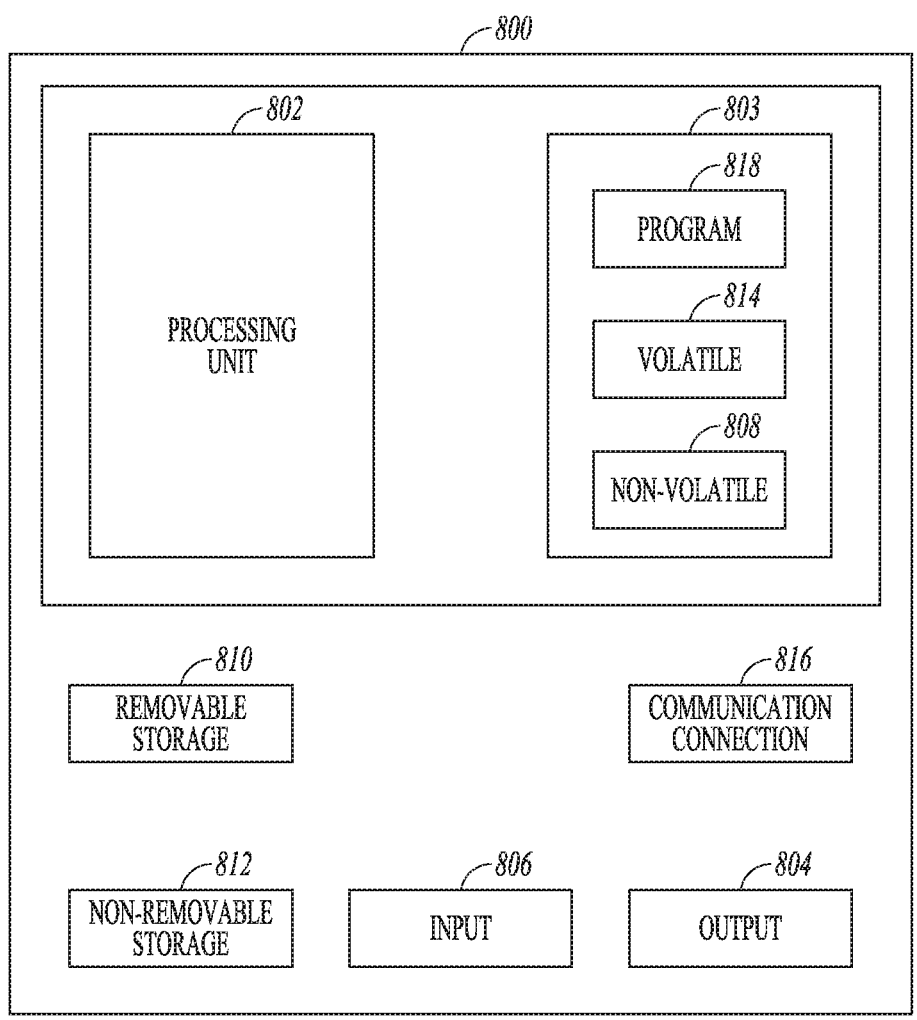
FIG. 8 is a block diagram of computer system used to implement methods according to an example embodiment.

FIG. 8 is a block schematic diagram of a computer system 800 to implement one or more methods to establish communication links and exclusive access areas of a virtual canvas according to example embodiments. All components need not be used in various embodiments. One example computing device in the form of a computer 800, may include a processing unit 802, memory 803, removable storage 810, and non-removable storage 812. Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 800 may include or have access to a computing environment that includes input 806, output 804, and a communication connection 816. Output 804 may include a display device, such as a touchscreen, that also may serve as an input device. The computer may operate in a networked environment using a communication connection to connect to one or more remote computers, such as database servers. The remote computer may include a personal computer (PC), server, smart phone, tablet, router, network PC, a peer device or other common network node, or the like. The communication connection may include a Local Area Network (LAN), a Wide Area Network (WAN), cellular phone transceiver, or other network connectors.

Computer-readable instructions stored on a computer-readable medium are executable by the processing unit 802 of the computer 800. A hard drive, CD-ROM, and RAM are some examples of articles including a non-transitory computer-readable medium. For example, a computer program 818 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 800 to provide generic access controls in a COM based computer network system having multiple users and servers.

EXAMPLES

1. A method comprising:
    determining where multiple users are interacting with a canvas via user devices;
    identifying two users that are interacting proximate to each other on the canvas via their user devices; and
    establishing a communication mechanism between the two users.
2. The method of example 1 wherein the canvas comprises a whiteboard drawing space.
3. The method of any of examples 1-2 wherein the user devices comprise a smart pen having an ID.
4. The method of any of examples 1-3 wherein the user devices comprise user computing devices having an ID to identify the user.
5. The method of any of examples 1-4 wherein the method is performed by an entity selected from the group consisting of a user device and a server accessed by the user devices.
6. The method of any of examples 1-5 wherein the communication mechanism comprises at least one of text messaging, email, interactive video, and chat.
7. The method of example 6 wherein each user device specifies a communication mechanism, and wherein establishing a communication link includes identifying a common communication mechanism between the two users and initiating the identified communication mechanism.
8. The method of any of examples 1-7 and further comprising:
    determining if the two identified users are no longer interacting on the canvas proximate each other; and
    removing the communication link between the no longer proximate users.
9. The method of example 1 and further comprising;
    identifying a third user interacting with the canvas proximate interactions of the two identified users; and
    adding the third identified user to the communication link.
10. The method of any of examples 1-9 wherein users are identified as proximate each other if they are interacting with the canvas in a same identified zone.
11. The method of any of examples 1-10 wherein users are identified as proximate each other if they are interacting with the canvas within an identified distance.
12. The method of any of examples 1-11 wherein interacting with the canvas comprises drawing on the canvas.
13. The method of any of examples 1-12 wherein interacting with the canvas comprises hovering over the canvas or tapping the canvas.
14. The method of any of examples 1-13 wherein users are identified as proximate each other when they are interacting with the canvas on related content.
15. The method of example 14 wherein related content are identified based on metadata provided by each user describing the content they are working on.
16. A machine readable storage device having instructions for execution by a processor of the machine to perform:
    determining where multiple users are interacting via user devices with a canvas;
    identifying two users that are interacting proximate to each other on the canvas via their user devices; and
    establishing a communication mechanism between the two users.
17. The machine readable storage device of example 16 wherein the user devices comprise an ID to identify the user and wherein the communication mechanism comprises at least one of text messaging, email, interactive video, and chat, and wherein each user device specifies a communication mechanism, and wherein establishing a communication link includes identifying a common communication mechanism between users interacting proximate to each other on the canvas and initiating the identified communication mechanism.
18. The machine readable storage device of any of examples 16-17 wherein the machine readable storage device comprises instructions for execution by a processor of the machine to further perform:
    determining if the two identified users are no longer interacting with the canvas proximate each other; and
    removing the communication link between the no longer proximately interacting users.
19. A device comprising:
    a processor; and
    a memory device having a program stored thereon for execution by the processor to:
    determine where multiple users are interacting with a canvas via user devices;
    identify two users that are interacting proximate to each other on the canvas via their user devices; and
    establish a communication mechanism between the two users.
20. The device of example 19 wherein the user devices comprise an ID to identify the user and wherein the communication mechanism comprises at least one of text messaging, email, interactive video, and chat, and wherein each user device specifies a communication mechanism, and wherein establishing a communication link includes identifying a common communication mechanism between two users interacting proximate to each other on the canvas and initiating the identified communication mechanism, and wherein the memory device program for execution by the processor to further:
    determine if the two identified users are no longer interacting proximate each other; and
    remove the communication link between the no longer proximately interacting users.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A method of facilitating communication between users of user computing devices having an TD to identify the user, the method comprising:
    determining using a system including a processor where multiple users are interacting via user devices with a canvas generated by an application running on the system, wherein the canvas has three or more dimensions;
    identifying, via the system and based on the ID in the user devices, two users that are creating content via user devices in respective identified zones, each of the respective zones having a size that is less than the entire canvas;
    determining a distance between the respective identified zones; and
    dynamically establishing via the system a communication mechanism between the two users in response to the determined distance being within a distance threshold.

2. The method of claim 1 wherein the user devices comprise a smart pen having an ID and wherein the distance between identified zones is a function of three or more dimensions of the canvas.

3. The method of claim 1 wherein the method is performed by an entity selected from the group consisting of a user device and a server accessed by the user devices.

4. The method of claim 1 wherein the communication mechanism comprises at least one of text messaging, email, interactive video, and chat.

5. The method of claim 4 wherein each user device specifies one or more preferred communication mechanisms, and wherein establishing a communication mechanism includes identifying a common communication mechanism between the two users and initiating the identified communication mechanism as the communication mechanism established between the users.

6. The method of claim 1 and further comprising:
determining if one or both of the two identified users are no longer creating content in their identified zones; and
when the two identified users are no longer both creating content in their identified zones, removing the communication mechanism between the two identified users.

7. The method of claim 1 and further comprising;
identifying a third user creating content in a further identified zone within the distance threshold; and
adding the third identified user to the communication mechanism.

8. The method of claim 1 wherein creating content on the canvas comprises drawing on the canvas.

9. A non-transitory machine readable storage device having instructions for execution by a processor of the machine to facilitate communication between users of user computing devices having an II) to identify the user, the instructions to perform:
determining via a system where multiple users are interacting via user devices with a canvas generated by an application running on the system, wherein the canvas has three or more dimensions;
identifying, via the system and based on the ID in the user devices, two users that are creating content via user devices in respective identified zones, each of the respective zones having a size that is less than the entire canvas;
determining a distance between the respective identified zones; and
dynamically establishing via the system a communication mechanism between the two users in response to the determined distance being within a distance threshold.

10. The non-transitory machine readable storage device of claim 9 wherein the communication mechanism comprises at least one of text messaging, email, interactive video, and chat, and wherein each user device specifies a communication mechanism, and wherein establishing a communication mechanism includes identifying a common communication mechanism between users and initiating the identified communication mechanism.

11. The non-transitory machine readable storage device of claim 9 wherein the machine readable storage device comprises instructions for execution by a processor of the machine to further perform:
determining that the two identified users are no longer creating content in their identified zones within the distance threshold; and
removing the communication mechanism between the two identified users in response to such determining.

12. A device comprising:
a processor; and
a memory device having a program stored thereon for execution by the processor to:
identify, via the system and based on the ID in the user devices, two users that are creating content via user devices in respective identified zones, each of the respective zones having a size that is less than the entire canvas;
determine a distance between the respective identified zones; and
dynamically establish via the system a communication mechanism between the two users in response to the determined distance being within a configured distance threshold.

13. The device of claim 12 wherein the communication mechanism comprises at least one of text messaging, email, interactive video, and chat, and wherein each user device specifies a communication mechanism, and wherein establishing a communication mechanism that includes identifying a common communication mechanism between two users creating content in the respective identified zones on the canvas and initiating the identified communication mechanism, and wherein the memory device program further has stored thereon instructions for execution by the processor to
determine if the two identified users are no longer creating content in their respective identified zones; and
when the two identified users are no longer creating content in their respective identified zones, remove the communication mechanism between the two identified users.

14. The method of claim 1, wherein identifying two users that are creating content via user devices in their respective zones on the canvas includes identifying that the respective zones overlap.

15. The method of claim 1, further comprising maintaining the communication mechanism for a specified period of time after the one of the two users stops creating content in their respective identified zones.

16. The method of claim 1, further comprising maintaining the communication mechanism until one of the two users is no longer creating content within the distance threshold.

17. The method of claim 1, wherein one of the three or more dimensions is a version of the canvas.

18. The method of claim 1, wherein one of the three or more dimensions is time.

* * * * *